(12) United States Patent
Fleck et al.

(10) Patent No.: US 7,941,765 B2
(45) Date of Patent: May 10, 2011

(54) SYSTEM AND METHOD OF CONTROLLING VARIABLES USING A RADIAL CONTROL MENU

(75) Inventors: David Fleck, Vancouver, WA (US); Ben Straub, Camas, WA (US); V. Thane Norton, III, Portland, OR (US)

(73) Assignee: Wacom Co., Ltd, Saitama-ken (JP)

( * ) Notice: Subject to any disclaimer, the term of this patent is extended or adjusted under 35 U.S.C. 154(b) by 653 days.

(21) Appl. No.: 12/106,688

(22) Filed: Apr. 21, 2008

(65) Prior Publication Data

US 2009/0187860 A1     Jul. 23, 2009

Related U.S. Application Data

(60) Provisional application No. 61/022,946, filed on Jan. 23, 2008.

(51) Int. Cl.
*G06F 3/048* (2006.01)
(52) U.S. Cl. ........ 715/834; 715/856; 715/815; 715/859; 345/157
(58) Field of Classification Search .................. 715/810, 715/815, 821, 834, 856, 857, 859, 860, 863, 715/977; 345/156, 157, 163, 169, 173
See application file for complete search history.

(56) References Cited

U.S. PATENT DOCUMENTS

| | | | |
|---|---|---|---|
| 5,559,527 A | 9/1996 | Quinn | |
| 5,596,699 A | 1/1997 | Driskell | |
| 5,615,325 A | 3/1997 | Peden | |
| 5,689,667 A | 11/1997 | Kurtenbach | |
| 5,701,424 A | 12/1997 | Atkinson | |
| 5,798,760 A | 8/1998 | Vayda et al. | |
| 5,828,360 A | 10/1998 | Anderson et al. | |
| 6,219,053 B1 | 4/2001 | Tachibana et al. | |
| 6,285,367 B1 | 9/2001 | Abrams et al. | |
| 6,359,635 B1 | 3/2002 | Perttunen | |
| 6,414,700 B1 | 7/2002 | Kurtenbach et al. | |
| 6,448,987 B1 | 9/2002 | Easty et al. | |
| 6,549,219 B2 | 4/2003 | Selker | |
| 6,854,088 B2 * | 2/2005 | Massengale et al. | 715/764 |
| 7,036,090 B1 | 4/2006 | Nguyen | |
| 7,036,091 B1 | 4/2006 | Nguyen | |
| 7,210,107 B2 | 4/2007 | Wecker et al. | |
| 2004/0070567 A1 * | 4/2004 | Longe et al. | 345/156 |

(Continued)

OTHER PUBLICATIONS

Guimbretiere et al., "FlowMenu: Combining Command, Text, and Data Entry" CHI Letters vol. 2, 2, pp. 213-216, (2000).

(Continued)

*Primary Examiner* — Xiomar Bautista
(74) *Attorney, Agent, or Firm* — Berenato & White, LLC

(57) ABSTRACT

A graphical user interface for displaying actions of an input device on a display is provided. The interface includes a radial menu having an origin disposed at a center thereof and at least a first wedge defining an area extending outwardly from the origin. The first wedge is associated with a variable that is capable of being set to a value between a predetermined minimum value and a predetermined maximum value. A cursor for indicating a current position of the input device on the display is provided in the interface. The cursor is movable within the first wedge to select a current value of the variable based upon the angular position of the cursor with respect to said origin. A radial menu, computer system, and method are also provided.

31 Claims, 12 Drawing Sheets

U.S. PATENT DOCUMENTS

| | | | |
|---|---|---|---|
| 2004/0221243 | A1 | 11/2004 | Twerdahl et al. |
| 2004/0250217 | A1 | 12/2004 | Tojo et al. |
| 2005/0044509 | A1 | 2/2005 | Hunleth et al. |
| 2005/0066291 | A1 | 3/2005 | Lewak |
| 2005/0097474 | A1 | 5/2005 | Accot |
| 2006/0095865 | A1 | 5/2006 | Rostom |
| 2007/0094597 | A1 | 4/2007 | Rostom |
| 2007/0101292 | A1* | 5/2007 | Kupka .................. 715/810 |
| 2007/0136690 | A1 | 6/2007 | MacLaurin et al. |
| 2007/0168890 | A1 | 7/2007 | Zhao et al. |
| 2007/0180392 | A1 | 8/2007 | Russo |
| 2009/0070363 | A1* | 3/2009 | Bull et al. ............. 707/102 |

OTHER PUBLICATIONS

Pook et al., "Control Menus: Execution and Control in a Single Interactor" CHI 2000, Apr. 1-6, 2000, pp. 263-264.

Lyons et al., "The Oval Menu-Evolution and Evaluation of a Widget" in 6th Australian Conference on Computer-Human Interaction, New Zealand, IEEE 1996, pp. 252-259.

Hopkins, "The Design and Implementation of Pie Menus" Dr. Dobb's Journal Dec. 1991 (www.art.net/~hopkins/Don/piemenus/ddj/piemenus.html.

Hopkins, "Pie Menu Cookbook" 1987.

McGuffin et al., "FaST Sliders: Integrating Marking Menus and the Adjustment of Continuous Values" Canadian Human Machine Communications Society (2002).

Hinckley et al., "Design and Analysis of Delimiters for Selection Action . . . " Proceedings of the SIGCHI conference on Human factors in computing systems (1994) (pp. 265-270).

Callahan et al., "An Empirical Comparison of Pie vs. Linear Menus" ACM CHI '88 Conference, Human Factors in Computing Systems, ACM, New York, 95-100 (pp. 63-74).

Kurtenbach et al., "The Hotbox: Efficient Access to a Large Number of Menu-Items" Proceedings of SIGCHI conference on Human factors in computing systems (1999) (pp. 231-237).

Accot et al., "More Than Dotting the I's—Foundations for Crossing-based . . . " Proceedings of the SIGCHI conference on Human factors in computing systems (2003) (pp. 181-196).

Winograd et al., "Visual Instruments for an Interactive Mural" CHI '99 Extended Abstracts on Human Factors in Computing Systems (1999)(pp. 191-196).

Cockburn et al., "Improving the Acquisition of Small Targets" People and Computers XVII, British Computer Society Conference . . . (2003)(pp. 181-196).

Lapizco-Encinas et al., "CrossEd: Novel Interaction for Pen-based Systems" College Park, MD: University of Maryland (2003).

Bederson, "Interfaces for Staying in the Flow" Ubiquity, vol. 5, pp. 1-1 (2004).

Kurtenbach et al., "Issues with Combining Marking and Direct Manipulation Techniques" Proceedings of the 4th annual ACM symposium . . . (1991)(pp. 137-144).

Kurtenbach et al., "Some Articulatory and Cognitive Aspects of 'Marking Menus'. . . " Toronto: Computer Systems Research Inst . . . (1991) (p. 31).

Kurtenbach et al., "User Learning and Performance with Marking Menus" Proceedings of the SIGCHI conference on Human factors in computing . . . (1994)(pp. 258-264).

Zhao et al., "Simple vs. Compound Mark Hierarchical Marking Menus" in Proceedings of the 17th annual ACM symposium . . . (2004)(pp. 33-42).

Mackay et al. "Which Interaction Technique Works When?. . ." Proc. Conference on Advanced Visual Interfaces, AVI'02 (2002) (pp. 203-208).

Smith et al., "The Radial Scroll Tool: Scrolling Support for Stylus . . . " Proceedings of the 17th annual ACM Symposium . . . (2004)(pp. 53-56).

Accot et al., "Beyond Fitt's Law: Models for Trajectory-Based HCI Tasks" in Proceedings of the SIGCHI conference on Human factors in computing systems pp. 295-302 (Mar. 1997).

Ritter et al., "The Learning Curve" in International Encyclopedia of the Social and Behavioral Sciences Oxford: Pergamon 2001, pp. 8602-8605.

Microsoft, "Tablet PC Support." vol. 2007 Seattle, Microsoft 2007.

Venolia et al "T-Cube: A Fast, Self-Disclosing Pen-Based Alphabet," in Proceedings of the SIFCHI conference on Human factors in computing systems (1994) pp. 265-270.

Mackenzie et al., "A Comparison of Input Devices in Elemental Pointing and Dragging Tasks" in proceedings of the SIGCHI conference on Human factors in computing systems (1991).

Mozilla, "Mouse Gestures", MOzilla, 200, (2000).

Apitz et al. "CrossY: Crossing-based Drawing Application" in proceedings of the 17th Annual ACM symposium on User interface software and technology (2004) pp. 3-12.

Tapia et al. "Some Design Refinements and . . . " in proceedings of the 8th annual ACM symposium on User interface and software technology (1995), pp. 189-195.

Fitts, "The Information Capacity of the Human Motor System . . . " Journal of Applied Psychology, vol. 47, pp. 381-391, 1954.

Shannon "A Mathematical Theory of Communication" The Bell System Technical Journal, vol. 27, pp. 379-423 Jul. 1948.

Mackenzie "Movement Time Prediction in Human-Computer Interfaces" in Proceedings of the conference on Graphics Interface 1992, pp. 140-150.

Accot et al., "Performance Evaluation of Input Devices in Trajectory Based . . . " proceedings of the SIGCHI conference on Human factors in computing systems.. 1999, pp. 466-472.

Accot et al., "Scale Effects in Steering Law Tasks" in proceedings of the SIGCHI conference on Human factors . . . 2001, pp. 1-8.

Balakrishnan et al. "Performance Differences in the Fingers, Wrist, and Forearm . . . " proceedings of the SIGCHI conference on Human factors . . . (1997), pp. 303-310.

Appert et al. "Context Matters: Evaluating Interaction . . . " proceedings of the HCI '04 Conference on people and computers XVIII, (2004), pp. 279-296.

Hopkins "Why Aren't Pie Menus Ubiquitous?" Inf@Vis!, 2003.

Kurtenbach "The Design and Evaluation of Marking Devices" (1993) pp. 1-201, University of Toronto.

\* cited by examiner

SYSTEM AND METHOD OF CONTROLLING VARIABLES USING A RADIAL CONTROL MENU

CROSS REFERENCE(S) TO RELATED APPLICATION(S) AND CLAIM TO PRIORITY

The present invention claims priority from Provisional Patent Application No. 61/022,946 filed on Jan. 23, 2008, the contents of which are incorporated by reference herein.

FIELD OF THE INVENTION

The present invention relates to a radial control menu and graphical user interface for presenting the radial control menu. The present invention also relates to a method of controlling variables using a radial control menu and a computer readable medium for performing the same.

BACKGROUND OF THE INVENTION

Various graphical user interfaces for interaction between an application and an input device have been designed and implemented according to Fitt's Law. Fitt's Law states that the further away the target is from the current position of the input device, or the smaller the target is, the more difficult the target is to select. The more difficult the target is to select, the higher the likelihood of missing the target.

In a Graphical User Interface (GUI) there are a number of different controls, sometimes called widgets, available for initiating actions and changing settings. These include buttons for performing actions, sliders, checkboxes, and radio buttons for changing settings, and pop-up or pull-down menus for actions or settings. For example, a menu might be used to indicate that a file should be saved, pressing a button could cancel a pending request, or checking a checkbox could change the boldness of text.

Because the central area of a display screen is typically used to display working documents, the controls used to change settings are typically positioned at the edge of the screen. For example, in a drawing application, menus for file and view operations are usually located at the top, and controls for color and tool selection are typically at the left or right edge of the screen. Although this placement avoids obscuring the image or document being manipulated, this makes these controls relatively inconvenient, resulting in longer times to access them. This is particularly true given that displays are becoming increasingly larger, thereby positioning the menus even further from the center of the display.

Attempts have been made to improve setting and menu selection methods. Radial selection techniques have been used in graphical user interfaces. The earliest form of a radial selection technique is a pie menu. Pie menus can be textual, iconic, or a combination of both. In some implementations, only the text is shown with no background or borders. Clicking in a pie segment makes a selection of an item. The number of choices can be extended through a hierarchy, where a second level menu is displayed at the location where the first menu item was chosen.

However, the format of the conventional pie menu has significant limitations. Specifically, the format of the conventional pie menu does not lend itself to setting and updating variables. Because setting or updating variables typically may involve steps that cannot be performed using conventional pie menus, other methods may be required to set and update variable values, for example, by visiting the menubar and selecting the appropriate option from a drop down menu to display a dialog for setting and/or updating the variables. Menubars, however, are typically positioned at the top or bottom of the screen, thus requiring the user to move the input device and cursor all the way across the screen to make a selection or adjustment.

In applications that require variables to be changed or updated constantly, accessing a menubar to either select a menu or change the variables is time consuming and inefficient. For example, when working in a graphics design application creating visual components of different visual characteristics, a designer needs to be able to readily access and change variables, such as color, brightness, opacity, etc.

Another form of conventional radial menu is a crossing menu. When a crossing method is used, the user is only required to cross into a sector or wedge of the menu, instead of crossing and selecting. A specific type of crossing menu is a flow menu. In the flow menu, the user makes a selection in the middle of the menu, then moves the cursor into a desired menu item, then back into the middle of the flow menu. The flow menu can be used to allow the user to make a series of selections in various levels of a hierarchy. For example, once a first selection is made in a first level of the menu, a second level of the menu can then be displayed for the user to make a second selection. The second level can be displayed once the user returns the cursor to the middle of the flow menu. Because the different levels of the hierarchy are not displayed until the cursor has returned to the middle of the flow menu, the flow menu remains displayed in the same position on the screen, thereby preventing subsequent levels from gradually moving the flow menu toward the edge of the screen. However, flow menus are frequently difficult for new users to learn how to use. Additionally, flow menus do not allow for continuous values to be selected, because the selections must be made by selecting particular menu items in the flow menu. "Marking menus" are similar to flow menus, and thereby suffer from the same drawbacks as flow menus.

Another control type, called a "slider", is used to set continuous variables. A slider control has an elongated track with a sliding element that can be moved along the track to set the value of a variable. The sliding element can be moved along the track based on movement of the cursor until the user makes a selection input to inform the slider control menu that the current value is to be selected based on the position of the sliding element. The sliding element can then be readjusted until it is dismissed. However, the slider control menu uses screen space inefficiently. For example, when there is more than one sliding element, the sliding elements are spaced across the screen so that any content displayed on the screen is not viewable. Additionally, a user must typically access another menu in order to invoke the slider control menu. This is time consuming and requires the user to know exactly how to find the slider control menu in the GUI. An example of a slider control menu is the volume control slider in the Apple® Macintosh® operating system.

Slider controls may also be included in tool palettes. However, tool palettes are often hidden and must be displayed by menu commands or keystroke combinations, and are usually located at the edge of the screen to avoid obscuring the document being worked on. Moving to the screen edge to access the sliders is time consuming. Examples of sliders in tool palettes are the sliders in Adobe Photoshop palettes.

A disadvantage of the above methods is that these selection techniques focus on menus that are relatively inflexible to allow controlling settings and choosing actions. One such control setting is the ability to represent state within a radial segment. Another is to allow continuous selections, as opposed to a discrete selection.

Accordingly, there is a need for an improved pie menu having more flexibility and applicability to various applications with numerous continuous value variables and/or state variables.

SUMMARY OF THE INVENTION

The present invention provides a graphical user interface for displaying actions of a pointing device on a display. The interface includes a cursor and a radial menu. The radial menu includes an origin disposed at the center of the radial menu and at least a first wedge defining an area extending outwardly from the origin. The wedge is associated with a variable that is capable of being set to a value between a predetermined minimum value and a predetermined maximum value. The cursor indicates a current position of the input device on the display. The cursor is movable within the first wedge for selecting a current value of the variable based upon the angular position of the cursor with respect to the origin.

The present invention also provides a radial menu for use with a graphical user interface. The menu includes at least one wedge representing a control variable. The wedge has a maximum radial boundary representing a predetermined maximum value for the control variable and a minimum radial boundary representing a predetermined minimum value for the control variable. The radial boundaries extend outwardly from an origin of the menu. At least one movable line indicator extends from the origin of the menu into the wedge. The line indicator has an adjustable angular position for selecting a value for the control variable between the predetermined maximum and minimum values. The value selected for the control variable is determined with respect to the predetermined maximum and minimum values by proportion to an angular distance between the line indicator and the maximum and minimum radial boundaries, respectively.

The present invention also provides a method of controlling at least one variable capable of being set to a value between a predetermined minimum value and a predetermined maximum value using an input device operably associated with a graphical user interface. The method includes the steps of activating a radial menu in the graphical user interface in response to a menu activation command. The radial menu has an origin and at least a first wedge associated with the variable extending from the origin so that the cursor is moveable inside the first wedge to select a current value for the variable based on the angular position of the cursor about the origin. The method further includes receiving a movement command via the input device. The movement command moves the cursor within the first wedge to change the angular position of the cursor about the origin. The current value of the variable is then changed to reflect the changed angular position of the cursor about the origin, and the current value of the variable is displayed.

The present invention also provides a method of using a radial control menu to set a value of a variable. The radial control menu is associated with an input device and a display. The input device has at least one button associated therewith, and the display has a cursor. The method includes receiving a first selection of the at least one button on the input device, and displaying the radial control menu on the display in response to the first selection. The radial control menu has an origin at a center thereof and at least one wedge extending from the origin. The radial control menu is displayed such that the origin thereof corresponds to a position of the cursor on the display. The method further includes moving the input device to move the cursor into the at least one wedge, and determining a current value of the variable based on an angular position of the cursor with respect to the origin and displaying the current value of the variable about the at least one wedge. A second selection of the at least one button is then received to set the value that is currently displayed as the value of the variable.

The present invention provides a computer system including a display displaying a graphical user interface having a radial control menu. The radial control menu includes a plurality of wedges, where at least one of the wedges includes a movable indicator located therein and movable to determine a value of a corresponding variable based on a position of the movable indicator with respect to at least one reference point within the wedge. An input device interacts with the graphical user interface, and a processing unit operably associated with the input device controls the graphical user interface and the radial control menu based on operation of the input device. The processing unit includes a value storage unit for storing a current value of the variable, and an indicator position unit in communication with the display, the input device, and the value storage unit. The indicator position unit controls the graphical user interface to display the movable indicator based on the current value of the variable and updates the current value stored in the value storage unit when the position of the movable indicator with respect to the at least one reference point is changed using the input device.

The present invention also provides a computer readable medium and/or driver containing executable code to perform the methods described herein.

DETAILED DESCRIPTION OF THE INVENTION

Figure 1A:
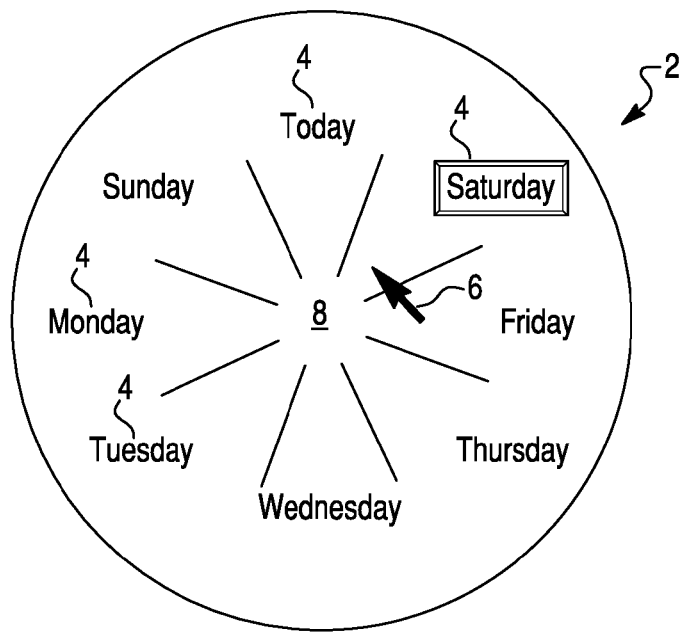
FIG. 1A is a diagram illustrating a prior art pie menu.

Reference will now be made in detail to the embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification.

As best shown in FIG. 1A, a prior art pie menu 2 includes several different menu items 4 from which a user can select using an input device (not shown) that moves a cursor 6. The pie menu 2 is advantageous, because the information is organized such that the items 4 are arranged around a central origin 8 of the menu 2. The pie menu 2 can be activated in a central region of a display (not shown), that is, close to where the cursor 6 is located. As a result, a user need not move to the edge of the display (not shown) in order to make a selection.

Figure 1B:
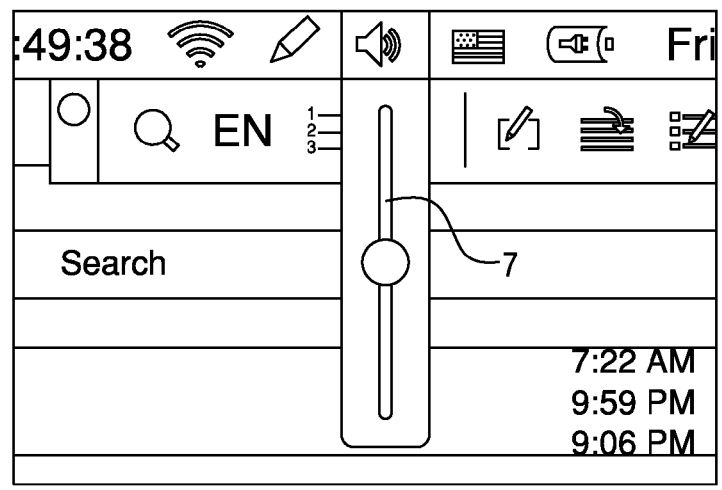
FIG. 1B shows an exemplary slider control menu.
Figure 1C:
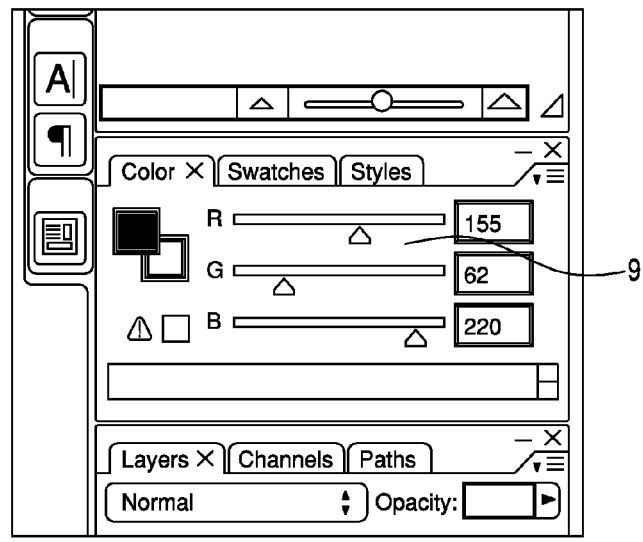
FIG. 1C shows an exemplary slider control.

As best shown in FIGS. 1B and 1C, slider control menus 7 and 9 allow a user to set values of a variable within a predetermined range. However, the slider control menus 7 and 9 are often hidden and must be displayed by menu commands or keystroke combinations, and are usually located at the edge of the screen to avoid obscuring the document or image being worked on. Thus, the slider control menus 7 and 9 are relatively difficult to access.

Figure 2:
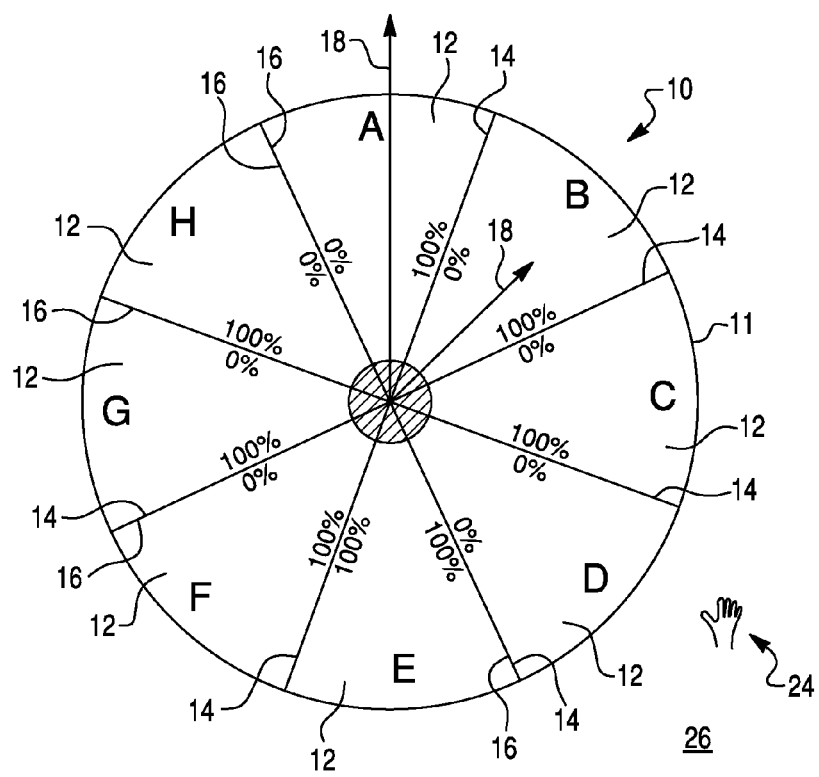
FIG. 2 is a diagram illustrating a radial control menu according to an embodiment of the present invention.

As best shown in FIG. 2, a radial control menu 10 according to an embodiment of the present invention includes a plurality of wedges 12. Each wedge 12 is defined by a maximum boundary 14 and a minimum boundary 16 representing maximum and minimum values, respectively, between which the value of a corresponding variable can be set. For example, if wedge A represents a brightness variable, the value of the brightness variable can be set between 100% represented by the maximum boundary 14 and 0% represented by the minimum boundary 16. Movable indicators 18 are disposed in each wedge 12 to provide visual feedback to a user of where the corresponding variable is set between the maximum value and the minimum value. As shown in FIG. 2, each movable indicator 18 can be a radial line extending from an origin 20 of the radial control menu 10 into the respective wedge 12. The movable indicators 18 are angularly displaceable around the origin 20 of the radial control menu 10. The origin 20 of the radial control menu 10 may be selected to deactivate the radial control menu 10, for example, when the user changes his or her mind about setting/updating the variable. Each of the wedges 12 preferably subtends a uniform angular amount, so that each is the same size. However this is not a requirement, as there are times such, as when mixing a single variable item with several fixed items, it may be desirable to make the fixed items smaller to allow for more items, while making the variable item larger to allow for easier selection of a value. This arrangement is best shown in FIG. 6C, which is described below.

It should be understood that although the maximum and minimum boundaries 14 and 16, respectively, are shown in FIG. 2 to be represented by a percentage value, other types of values may alternatively be used. For example, the maximum and minimum values may be shown as a range of integers.

Figure 3A:
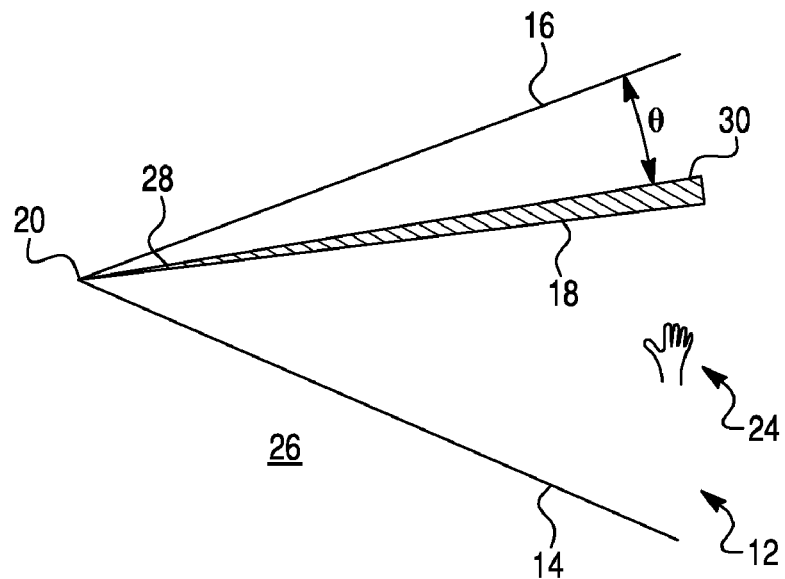
FIGS. 3A to 3D illustrate a wedge of a radial control menu according to different embodiments of the present invention.

As best shown in FIG. 3A, the movable indicator 18 in the wedge 12 is angularly displaceable to adjust the value of the corresponding variable continuously. A user can use an input device 22 (see FIG. 9) to select the movable indicator 18 and move the indicator 18 angularly about origin 20. The input device 22 may be a mouse, keyboard, stylus, pointing device, or the like. For example, if the input device 22 is a mouse, the movable indicator 18 may be selected by clicking the mouse and then holding and dragging the movable indicator 18 to its desired location. The mouse button may then be released to set the movable indicator 18 and set the corresponding variable to its new value.

In most graphical user interfaces, a movable cursor 24, such as an arrow, a bracket, or a hand symbol, is used to provide a user visual feedback as to the position of the input device 22 (see FIG. 9) with respect to a graphical user interface 26. The cursor may also be referred to herein and in the Figures as a "pointer" or a "position indicator." Thus, the user can select the movable indicator 18 using the cursor 24.

Figure 9:
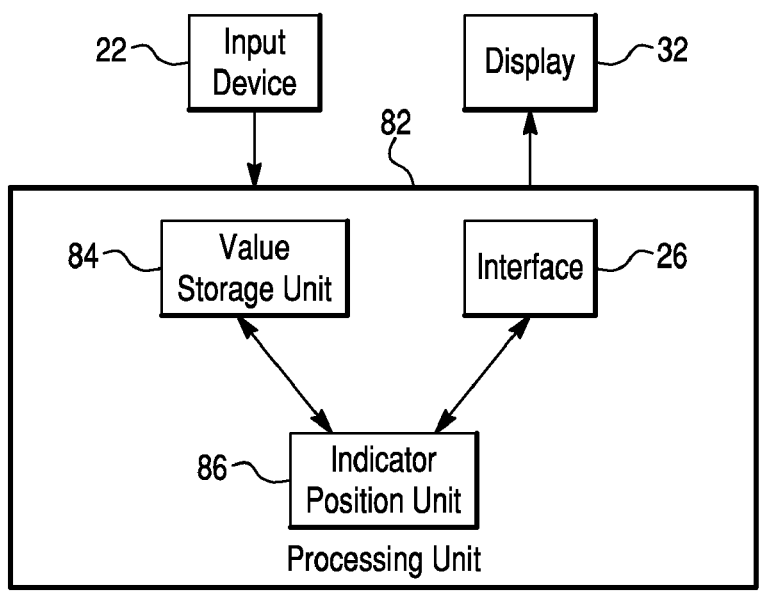
FIG. 9 is a block diagram illustrating a system for implementing a radial control menu according to yet another embodiment of the present invention.

As one of ordinary skill in the art will appreciate, the graphical user interface 26 refers to software or a computer program running on a processing unit 82 (see FIG. 9) which allows a user to interact with a display 32 (see FIG. 9) using the input device 22 (see FIG. 9). The graphical user interface 26 may be specifically designed for a particular application, or may be a standard operating system graphical user interface, such as the interface provided by Microsoft Windows. The input device 22 may be a digitizer tablet, graphics tablet, or pen tablet device associated with a stylus or pointer, such as manufactured by Wacom Co., Ltd.

The movable indicator 18 has a first end 28 and a second end 30 opposite the first end 28. The movable indicator 18 can be angularly displaced by either the first end 28, the second end 30, or any point in between ends 28 and 30. Due to the differences in the amount of movement required of the input device 22 (see FIG. 9) to effect the same amount of angular displacement of the movable indicator 18 using the first end 28 versus the second end 30, a user can vary the amount of movement and/or precision with which the position of the movable indicator 18 is positioned. Thus, a user that desires to minimize the amount of movement of the input device 22 can move the movable indicator 18 close to the first end 28. On the other hand, a user that desires to be more precise in the placement of the movable indicator 18 can use the second end 30. This advantage is readily appreciated, for example, when a large screen or monitor is used as a display 32 (see FIG. 9). As best shown in FIG. 3A, the second end 30 of the movable indicator 18 may be wider than the first end 28 to make it easier to select.

It will be appreciated that the selectable movable indicator 18 is an exemplary and is not intended to limit the scope of the invention. One of ordinary skill will appreciate that the movable indicator 18 need not be selectable, but instead can be a visual indicator that is moved automatically based on the position of the cursor 24, as described below.

Figure 3B:
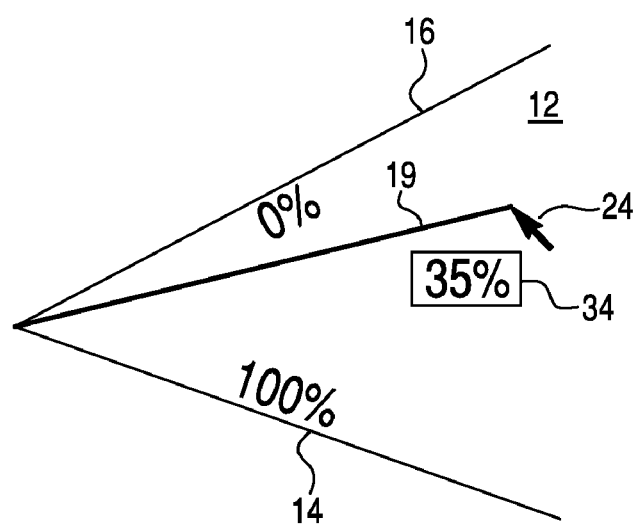

As best shown in FIG. 3B, a line indicator 19, for example, a "rubber band" line extends from an origin (not shown in FIG. 3B) to the current location of the cursor 24 within the wedge 12. The end of the line indicator 19 coincides with the location of the cursor 24 so that movement of the cursor 24 changes the angular position of the line indicator 19 and/or the length of the line indicator 19. For example, when the cursor 24 is moved toward the origin, the length of the line indicator 19 is shortened. Similarly, when the cursor 24 is moved away from the origin, the length of the line indicator 19 is increased. When the cursor 24 is moved angularly about the origin, the line indicator 19 is moved angularly about the origin. The angular movement and the change in length of the line indicator 19 may occur simultaneously. Accordingly, the line indicator 19 provides the user with visual feedback about the amount of angular movement of the cursor 24. The user can extend the line indicator 19 further from the origin when the user requires more precise value adjustment of the variable. Alternatively, the user can move the line indicator 19 toward the origin so that less movement is required to change the angular position and the value of the variable.

As best shown in FIG. 3B, a current value indicator 34 may be shown within the wedge 12 to allow the user to ascertain the current value of the corresponding variable as a function of the current angular position of the line indicator 19 (or cursor 24) between the maximum and minimum boundaries 14 and 16. The current value indicator 34 need not be in the wedge 12, but may be located outside the wedge. Additionally, the current value indicator 34 may remain hidden until the line indicator 19 is first moved or until the cursor 24 is first moved into the wedge 12. In this case, the current value indicator 34 may be activated and displayed when the graphical user interface 26 first determines that the input device 22 (see FIG. 9) has moved the cursor 24 into the wedge 12. To make this determination, the graphical user interface 26 accesses a current position of the boundaries 14 and 16 of the wedge 12 and compares this current position to a position of the cursor 24 on the display 32 (see FIG. 9). If the position of the cursor 24 is between the boundaries 14 and 16 of the wedge 12, the graphical user interface 26 displays the current value indicator 34. In this manner, the current value indicator 34 will not distract the user's attention from the different wedges 12 of the radial control menu 10 until the user has already indicated an intention to adjust the variable associated with a particular wedge 12 and the current value indicator 34.

Although not shown in FIG. 3A, if the current value indicator 34 is used in the wedge 12 of FIG. 3A, the current value indicator 34 may be activated and displayed when the graphical user interface 26 first determines that the input device 22 (see FIG. 9) has selected the movable indicator 18 for movement. To make this determination, the graphical user interface 26 accesses a current position of the movable indicator 18 from storage and compares this current position to a position of the cursor 24 on the display 32 (see FIG. 9). If the position of the cursor 24 and the movable indicator 18 match and the input device 22 determines that the user has pressed a selection button, the graphical user interface 26 determines that the movable indicator 18 has been selected for movement and the current value indicator 34 is displayed. It should be understood that the current value indicator 34 best shown in FIG. 3B can be applied to any of the radial menus described herein in the manner described above.

Figure 3C:
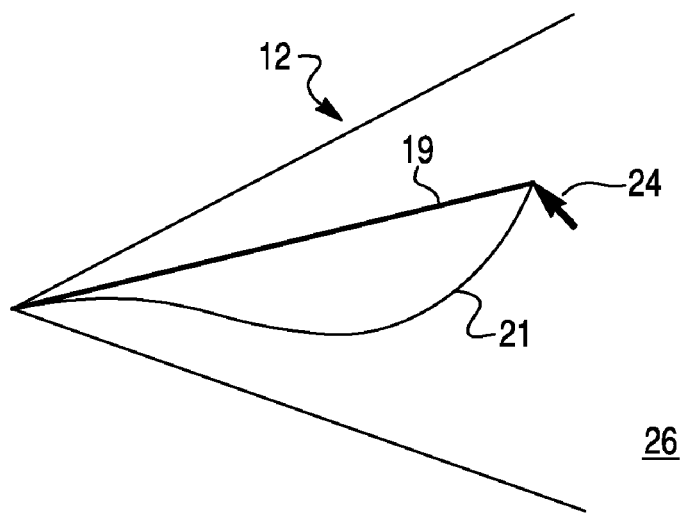

As best shown in FIG. 3C, the wedge 12 includes both the line indicator 19 described above and a path tracing element 21. In the embodiment shown in FIG. 3C, the value of the variable that corresponds to the wedge 12 may be set based on the angular position of the line indicator 19 or the angular position of the cursor 24. The path tracing element 21 continuously traces the path along which the cursor 24 is moved in the graphical user interface 26. The path tracing element 21 shows the history of movement of the cursor 24 even when the cursor 24 moves between different wedges in the radial menu or outside the radial menu.

Figure 3D:
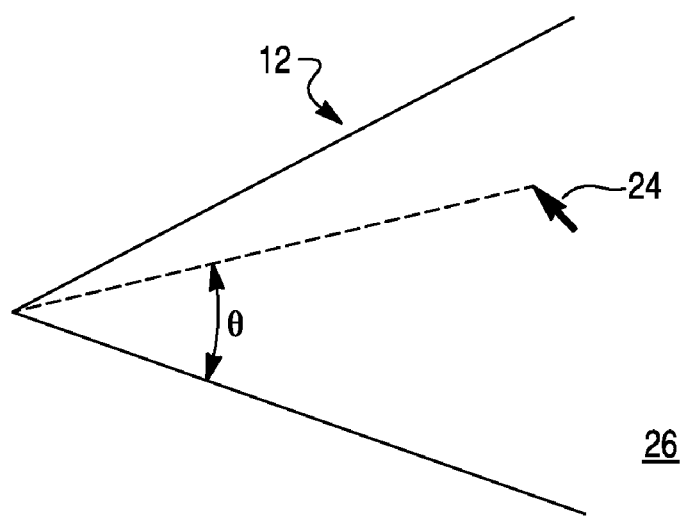

As best shown in FIG. 3D, the value of the variable corresponding to the wedge 12 is determined by the angular position of the cursor 24. In this embodiment, there may be no other position indicating components in the wedge 12, although a current value indicator (not shown in FIG. 3D), may be used.

Thus, as compared with the embodiments of FIGS. 2 and 3A, the embodiments of FIGS. 3B, 3C, and 3D do not require a user to select and drag the movable indicator 18 (see FIGS. 2 and 3A), but instead the user can select a value by simply moving the cursor 24 to the target location and selecting the target location.

By comparison, in another type of radial control menu (not shown) that uses a movable indicator which determines the value of the corresponding variable based on the radial distance away from an origin of the menu, a user is required to move the indicator far from the origin in order to set the variable to greater values. This is less efficient than using angular position/displacement to set the variable value. With regard to the embodiments illustrated in FIGS. 2 and 3A to 3D, because the value of the corresponding variable is determined with respect to the maximum and minimum values by proportion to an angular distance between the movable indicator 18, line indicator 19, or the cursor 24 and the maximum and minimum boundaries 14 and 16, respectively, the amount of movement of the cursor 24 and the input device 22 can be minimized.

The value of the corresponding variable can be determined/set in a number of ways. For example, referring to the wedge 12 shown in FIGS. 2 and 3A, the value may be set based on the angle between the movable indicator 18 and the maximum or minimum boundary 14 or 16. In this case, assume the minimum value of the variable represented by the minimum boundary 16 is 0, the maximum value of the variable represented by the maximum boundary 14 is 90, and the size of the wedge 12 corresponds to 90 degrees of the 360 degree radial control menu 10. Thus, when the movable indicator 18 is moved 5 degrees angularly toward the maximum boundary 14, the value of the corresponding value increases by 5 toward the maximum value. The variable values set by movement of the movable indicators 18 within each wedge 12 may be set between the maximum and minimum values using any increment value subject to restrictions based on size of the menu 10 and arc of the wedges 12, as described below. Although a wedge of 90 degrees is described above as being used to set a variable having a max value of 90, it will be appreciated that other arc angles and/or other maximum values may be used where the ratio of change in variable value to degree of movement is not necessarily one to one. The value of the corresponding variable can be determined/set in a similar manner using other embodiments of the present invention.

Figure 4:
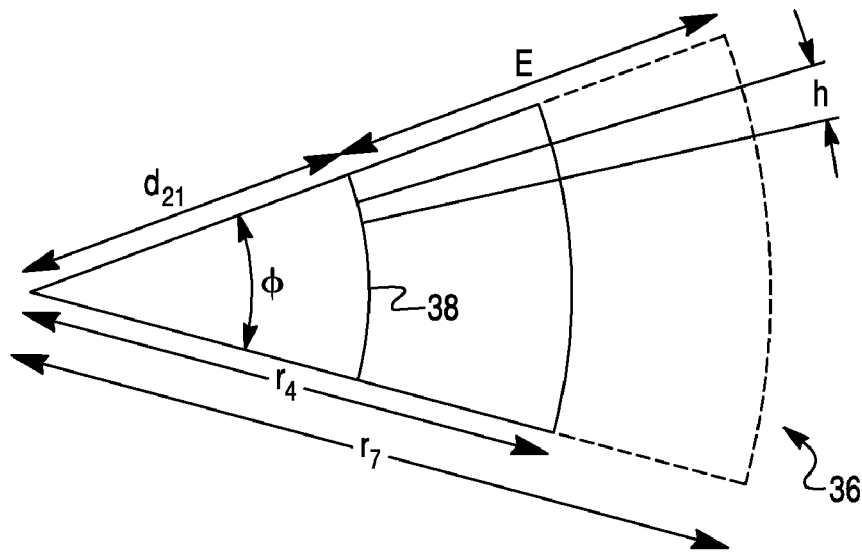
FIG. 4 is a dimensional diagram illustrating a wedge of a radial control menu according an embodiment of the present invention.

The layout, interaction, and size parameters of an exemplary embodiment of the present invention are now discussed with reference to FIG. 4. FIG. 4 shows a wedge 36 of a radial control menu, which is not drawn to scale. The sizes and parameters of the embodiment shown in FIG. 4 are exemplary and are not intended to limit the scope of the present invention. This description is being provided for explanation and illustration purposes. Generally, two dimensions should be considered when investigating menu size. These dimensions are the diameter of the menu, and the arc subtended by a menu item. Pie menus typically have eight or more items. As will be seen, more than eight items are usually feasible for continuous menus with very large diameters. Menus with the even numbers of four, six, and eight items are considered here. These correspond to angles subtended by each wedge 34 of 90°, 60°, and 45°, respectively.

The smallest target possible is a single pixel. If the range of numbers is 0 to 100 in increments of 5, a total of 21 pixels are needed to achieve each value. Each pixel represents an increment of 5 between 0 and 100. This limit dictates a minimum arc 38 of no less than 21 pixels in length. If an attempt is made to select any given value at a point closer to the origin than this minimum arc 38, not all values will be attainable. The distance from the origin to the arc 38 of 21 pixels is shown as distance $d_{21}$ in FIG. 4. This distance will vary with the angle subtended by the wedge.

The parameters in FIG. 4 are as follows:

$d_{21}$— The distance from the center of the menu to the arc 38 where every value in a 5% control (the minimum arc 38 is 21 pixels in length) can be selected. Although not shown, $d_{101}$ would be the distance for a 1% control (the minimum arc 38 is 101 pixels in length)

-continued

| | |
|---|---|
| φ— | the angle subtended by the wedge. This is 90° for a menu with 4 items or wedges 36, 60° for a menu with 6 items or wedges 36, or 45° for a menu with 8 items or wedges 36 |
| $r_4$— | radius of a 4 cm diameter menu |
| $r_7$— | radius of a 7 cm diameter menu |
| w— | target width for a single value |
| h— | maximum target height for a single value (the target is one pixel at $d_{21}$ and gets larger until it reaches h at the maximum radius) |

Table 1 details the minimum distances for $d_{21}$ and $d_{101}$ for various item/wedge angles on a display screen with 100 Dots Per Inch (DPI) resolution.

TABLE 1

$d_{21}$ and $d_{101}$ distances at 100 DPI

| | Arc of | |
|---|---|---|
| Angle | $d_{21}$ | $d_{101}$ |
| 45° | 0.68 cm | 3.27 cm |
| 60° | 0.51 cm | 2.45 cm |
| 90° | 0.34 cm | 1.63 cm |

As can be determined using the above table, a menu item from a 4 cm diameter (2 cm radius) menu with 8 items, i.e., φ=45°, would have a target width (w) of 1.32 cm for a 5% resolution control. This would be calculated as follows: $d_{21}$ for 45°=0.68. $d_{21}$ is a function of the resolution of the screen (DPI) and the angle φ subtended by the wedge. When $d_{21}$ is subtracted from the radius of the menu, 2 cm−0.68 cm=1.32 cm, the target width (w) of 1.32 is obtained. Also using Table 1, the minimum distance for a 101-pixel arc ($d_{101}$), which can achieve a resolution of 1% can be determined to be not less than a 6.54 cm diameter menu with 8 menu items (45° items). The parameters for a 1% resolution are determined in the same manner as the parameters for a 5% resolution.

TABLE 2

Target height (h) for 5% resolution at 100 DPI

| h in Pixels | Menu Diameter | | | | | | |
|---|---|---|---|---|---|---|---|
| Angle | 4 cm | 5 cm | 6 cm | 7 cm | 8 cm | 9 cm | 10 cm |
| 45° | 2.94 | 3.68 | 4.42 | 5.15 | 5.89 | 6.63 | 7.36 |
| 60° | 3.93 | 4.91 | 5.89 | 6.87 | 7.85 | 8.83 | 9.82 |
| 90° | 5.89 | 7.36 | 8.83 | 10.31 | 11.78 | 13.25 | 14.72 |

TABLE 3

Target height (h) for 1% resolution at 100 DPI

| h in Pixels | Menu Diameter | | | | | | |
|---|---|---|---|---|---|---|---|
| Angle | 4 cm | 5 cm | 6 cm | 7 cm | 8 cm | 9 cm | 10 cm |
| 45° | 0.61 | 0.77 | 0.92 | 1.07 | 1.22 | 1.38 | 1.53 |
| 60° | 0.82 | 1.02 | 1.22 | 1.43 | 1.63 | 1.84 | 2.04 |
| 90° | 1.22 | 1.53 | 1.84 | 2.14 | 2.45 | 2.76 | 3.06 |

The width of the target (w) is defined as the menu radius minus $d_{21}$ or $d_{101}$ for the 5% resolution or the 1% resolution, respectively. The height (h) refers to the amount of radial movement necessary to change the value of the variable. The height at the minimum arc 38 of the target has been defined as one pixel. Next, the height (h) at the other end of the target opposite the minimum arc 38 is considered. Tables 2 and 3 show the largest target height (h), which occurs at the outer circumferential boundary of the wedge 36 opposite the minimum arc 38. Looking at the values in Table 3 that are greater than one pixel, 1% resolution can only be achieved with large diameter menus, or menus with fewer items. Note that with an unbounded menu in which the wedge 36 does not have an outer circumferential boundary, both (w) and (h) can potentially be much larger, limited only by the distance to the edge of the display 32 (see FIG. 9). The target height determines the ease with which a target value may be selected using the radial position of a movable indicator, which is not shown in FIG. 4. That is, the target height determines the area in which the target value may be selected. It is therefore desirable to have a large height (h) so that it is easier to select the target value for the variable with precision.

Figure 5A:
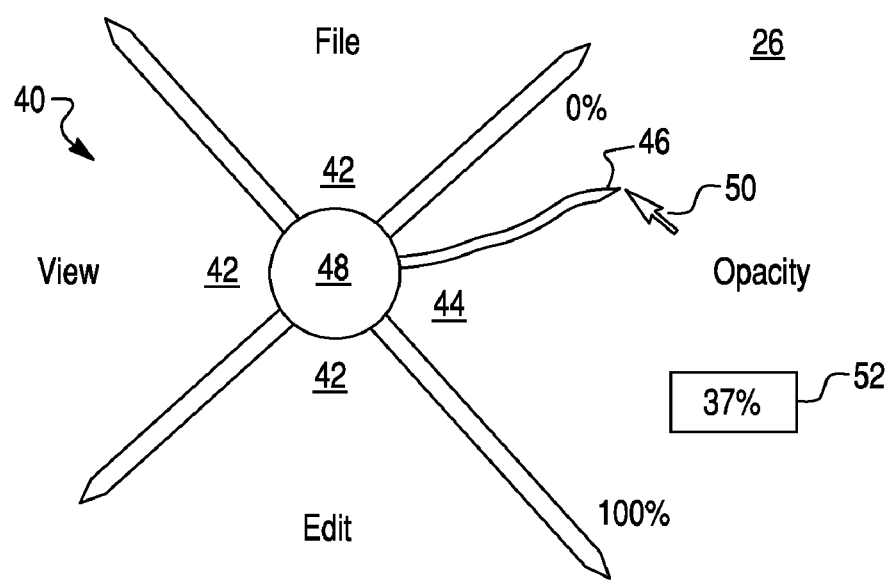
FIGS. 5A to 5D are user interface diagrams illustrating exemplary arrangements for radial control menus according to embodiments of the present invention.

As best shown in FIG. 5A, a radial control menu 40 may include wedges 42 that represent functions or toggle (binary state) variables in combination with one or more wedges 44 that represent continuous value variables. The radial control menu 40 shown in FIG. 5A is unbounded, meaning the wedges 42 and 44 extend to the edge of the graphical user interface 26. This makes it easy for the user to select the target value, because the target position of a movable indicator 46 is easy to select.

A movable indicator may be a selectable line indicator, a rubber band line, or a path tracer. The movable indicator of the radial control menu 40 is a path tracer 46 drawn from an origin 48 of the radial control menu 40 into the desired wedge 44. The path tracer 46 traces the path followed by a cursor 50 into the desired wedge 44. For example, when the input device 22 (see FIG. 9) issues a menu activation command, the radial control menu 40 may be displayed around the cursor 50. The cursor 50 can then be moved into the desired wedge 44, thereby tracing the movement of the cursor 50 in the interface 26, as best shown in FIG. 5A. The path tracer 46 need not be straight, because it is the end of the path tracer 46 that determines the location for setting/updating the value of the corresponding variable. Thus, as compared with the embodiment of FIGS. 2 and 3A, a user need not select and drag the movable indicator 18 (see FIGS. 2 and 3A), but instead can select a value by simply moving the cursor 50 to the target location.

As an example, the variable "Opacity" may correspond to the wedge 44. A current value indicator 52 may display the current value of the corresponding variable so that a user can ascertain where the variable is currently set between the maximum and minimum values. The current value indicator 52 of the wedge 44 is set to 37%.

Figure 5B:
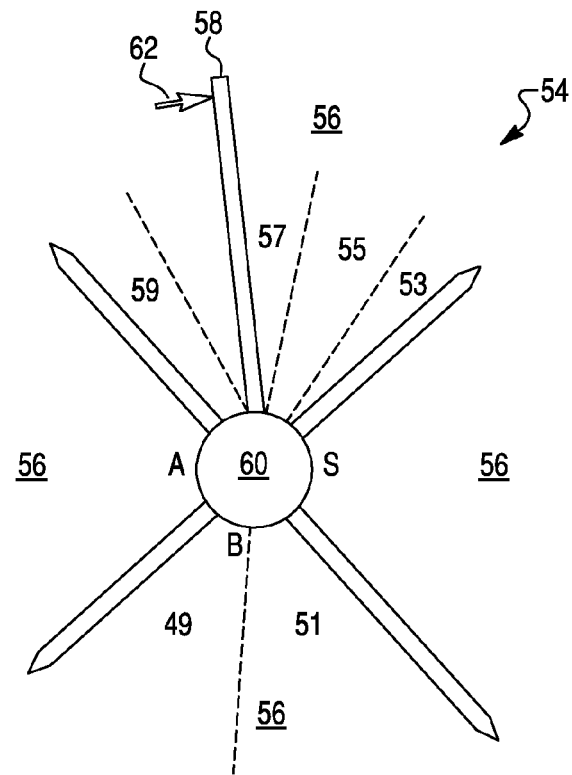
Figure 5C:
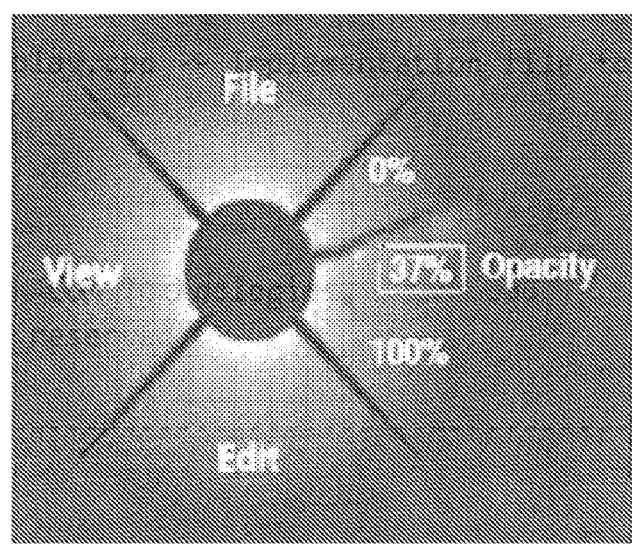
Figure 5D:
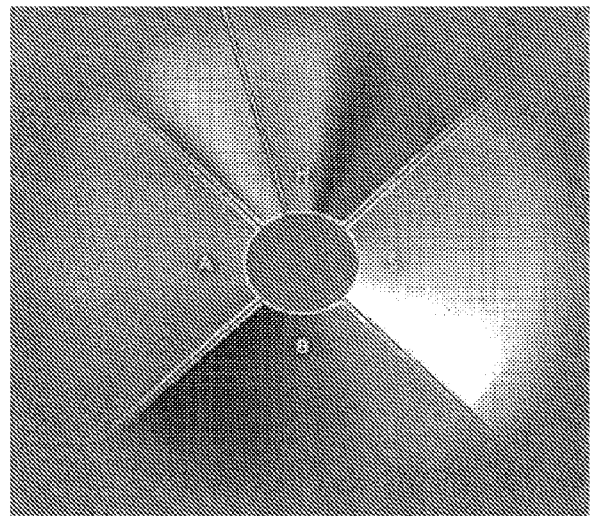

As best shown in FIG. 5B, a radial control menu 54 has wedges 56 with visual characteristics that represent various values of the corresponding variables to be set using the wedges 56. For example, in wedge B shown in FIG. 5B, the darkness/brightness of the coloring varies. Thus, a user can ascertain the effect of moving a movable indicator 58 to a particular location of the wedge 56 prior to actually selecting the target location in the wedge B. Wedge B has a dark side 49 and a bright side 51, which are separated by a dashed line. Although not shown, the bright side 51 and dark side 49 are gradually blended around the dashed line so that the user can select the appropriate brightness value. Wedge H includes areas of various colors 53, 55, 57, and 59 extending from an origin 60 of the radial pie menu 54. Here, one of the various colors can be selected for a color variable by moving a cursor 62 to the appropriate location of the wedge H or by selecting and moving the movable indicator 58 angularly to the appropriate position corresponding to the target value. Thus, while the embodiment of FIG. 5B does not show an actual numerical value of the variable or the maximum and minimum values, the radial control menu 54 visually indicates the effect of setting the variable to various locations within the radical control menu 54. The radial control menu 54 shown in FIG. 5B may be especially useful in graphic design applications, because a graphic designer can view visual characteristics, such as color, brightness, contrast, etc., prior to making a selection. FIGS. 5C and 5D correspond to FIGS. 5A and 5B, respectively, but use shading to illustrate differing visual characteristics. For example, the darker portion of wedge B in FIG. 5D corresponds to the dark side 49 of FIG. 5B, whereas a brighter portion of wedge B in FIG. 5D corresponds to the bright side 51 of FIG. 5B. Similarly, different shades in wedge H shown in FIG. 5D represent the various colors 53, 55, 57, and 59 of wedge H shown in FIG. 5B.

Figure 6A:
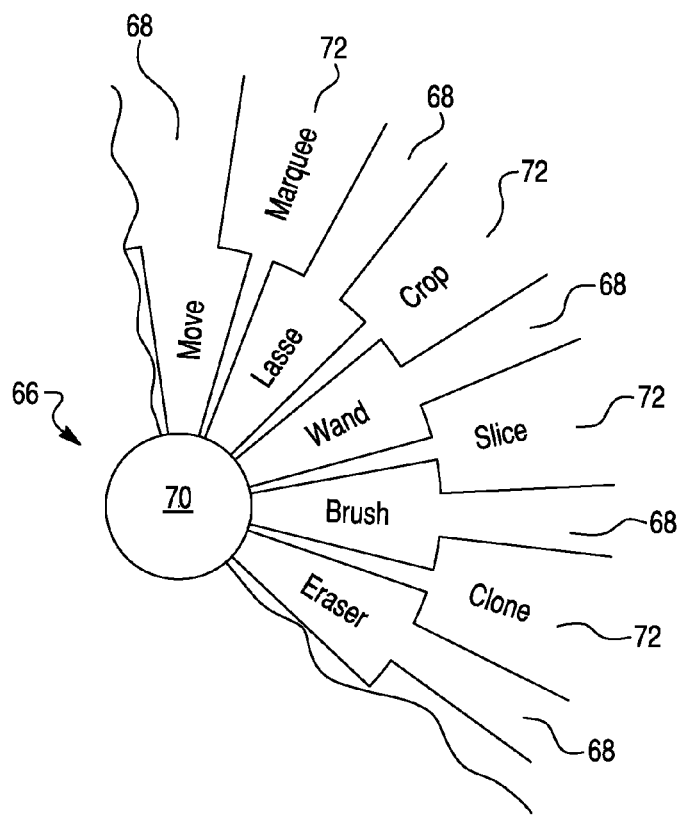
FIGS. 6A to 6C are diagrams illustrating various exemplary arrangements for radial control menus according to alternative embodiments of the present invention.
Figure 6B:
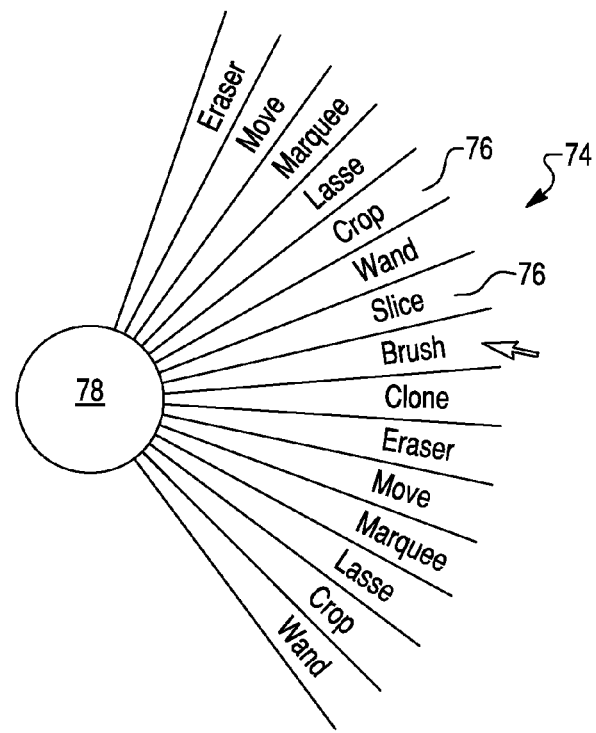
Figure 6C:
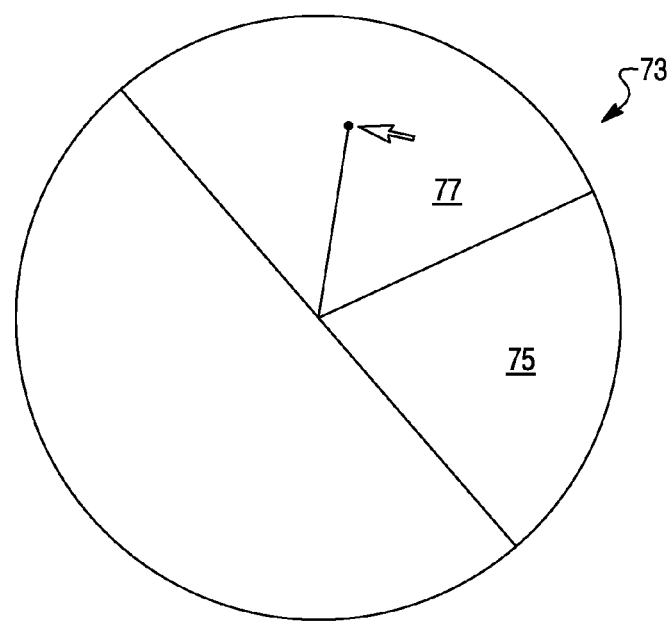

FIGS. 6A to 6C show alternate embodiments of the present invention. FIG. 6A shows a staggered radial control menu 66 having a first plurality of menu items 68 with a wedge shape that is wider closer to an origin 70 of the menu 66 and second plurality of menu items 72 with a wedge shape that is wider farther away from the origin 70 of the menu 66. As best shown in FIG. 6A, the first and second menu items 68 and 72 may be arranged in an alternating manner such that the first menu items 66 are wider where the second menu items 68 are not wide, and vice versa. Thus, each of the menu items 68 and 72 has an area that is relatively wide, i.e., a selection area, to enable easy selection by a user. Each of the menu items 68 and 72 have an area that is relatively narrow, i.e., a non-selection area, in which no selection is made. This arrangement allows a much larger number of items for a given menu.

In an embodiment in which a variable can be set using the menu items 68 and 72, the wider areas of these items 68 and 72 may be selection areas used to set corresponding variables. In this case, an angular position within the selection areas can be used to determine the value of the variable. Thus, although not shown in FIG. 6A, a movable indicator, such as the movable indicator 18 shown in FIG. 2, the line indicator 19 or "rubber band" line shown in FIG. 3B, or the path tracer 46 shown in FIG. 5A, may be used in the selection areas of the menu items 68 and 72. Additionally, a current value indicator, a maximum value indicator, and a minimum value indicator may also be displayed in association with these selection areas.

As best shown in FIG. 6B, a radial control menu 74 has a plurality of wedges 76 densely arranged around an origin 78 of the menu 74. The wedges 76 may each represent graphic design tools, such as an eraser, a brush, a slicer, a cropper, etc.

As best shown in FIG. 6C, a radial menu 73 includes at least one fixed item selection wedge 75 in which an item or function can be selected and at least one variable item selection wedge 77 in which the value of a continuous variable can be set. The variable item selection wedge 77 may be any one of the wedges 12, 36, 44, or 56 described in previous embodiments in which the value of the corresponding variable can be set according to the angular position of a cursor, movable indicator, etc. As best shown in FIG. 6C, the variable item selection wedge 77 is larger than the fixed item selection wedge 75 so that it is easier for a user to manipulate the value of the variable by movement within the wedge 77. Additionally, because the user can select the item or function associated with the fixed item selection wedge 75 by simply selecting anywhere in the wedge 75, the wedge 75 does not require as much area for a user to be able to effectively select this item.

There are several different types of methods by which wedges, items, or variable values may be selected for the embodiments of FIGS. 2 through 6C. For simplicity sake, these methods will be described with reference to the radial control menu 10 shown in FIG. 2 and the radial control menu 40 shown in FIG. 5A. However, it should be understood that these methods or variations on these methods can be used with any of the radial menus and/or wedges shown and described herein.

When a menu activation command is received at the input device 22 (see FIG. 9), the graphical user interface 26, which communicates with the input device 22, displays the radial control menu 10 in response to the menu activation command. The radial control menu 10 of FIG. 2 is preferably displayed such that the origin 20 of the menu 10 is positioned where the cursor 24 is located in the graphical user interface 26 when the menu is initially displayed. This provides the user immediate access to any one of the wedges 12 with a minimal amount of movement of the input device 22 (see FIG. 9).

Figure 7A:
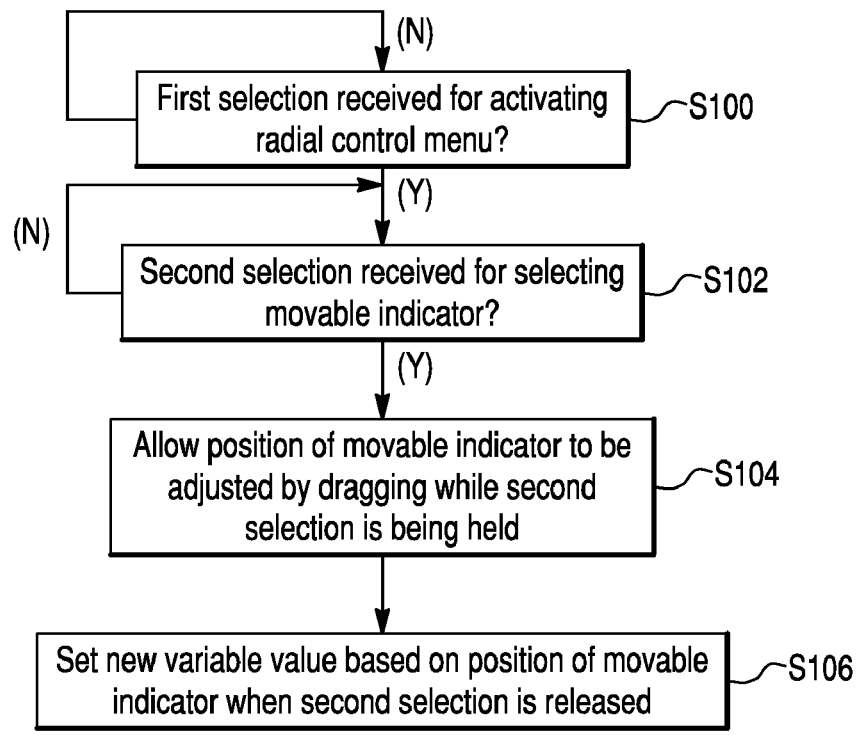
FIGS. 7A to 7D are flow chart diagrams showing radial control menu selection methods according to various embodiments of the present invention.

The menu activation command may be assigned to a particular button on the input device 22. For example, the menu activation command may be set to a right or left button on a mouse, a specific key on a keyboard, a button or input of a stylus of a digitizer tablet, or a button located on a digitizer tablet body. As best shown in FIG. 7A, a first selection of the assigned button may invoke the menu 10 at step S100, which is shown on the display at step S102, while a second selection of the assigned button may be used to select an item or a value within the wedges 12 and/or select the movable indicator 18 at step S102. In this case, the movable indicator 18 may be dragged while the second selection is being held at step S104 so that the appropriate location within the wedge 12 is selected when the second selection is released at step S106.

A menu item/wedge selection button may be different than the button assigned to activate the menu 10. In this case, the menu 10 may be activated by a first button for issuing the menu activation command, then another button on the input device 22 (see FIG. 9) is used to select and/or move the movable indicator 18 by, for example, clicking, dragging, and releasing the movable indicator 18. Thus, the menu 10 can be invoked and a wedge/item can be selected by two button selections (one to invoke the menu 10 and one to select the wedge/item/value).

Figure 7B:
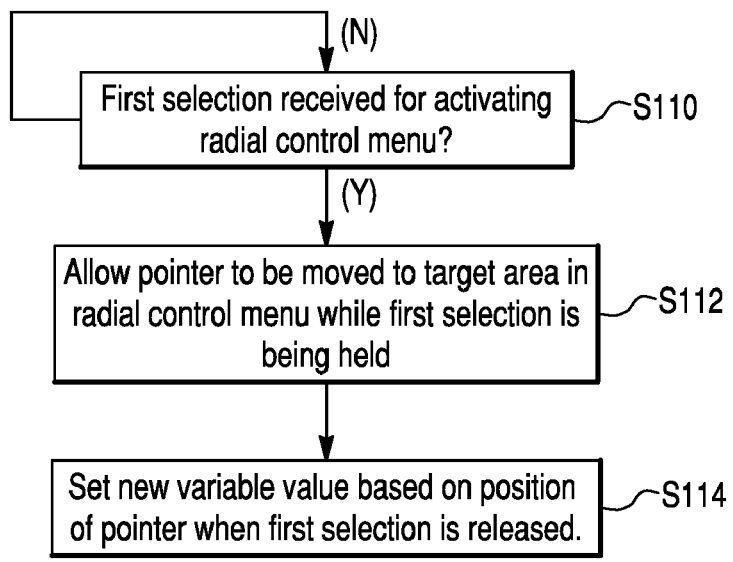

In another embodiment of the present invention, a single button selection may be used to select a wedge, an item, or a value for a variable using the radial control menu 10. In this case, the button selection invokes the menu and the release of the selection selects the menu item/wedge/value. As best shown in FIG. 7B, a menu activation command is received by a first selection at step S110. Once the menu is shown on the display at step S111, the position of the cursor 24 may be moved to a target area while the first selection is being held at step S112. Then, when the first selection is released, a new variable value is set based on the position of the cursor 24 at step S114.

Certain types of selections are better suited to certain radial control menus described above. For example, the single button selection may be used with the embodiments of FIGS. 31, 3C, 3D, and/or 5A, because the user need not select and move a movable indicator associated with the wedge. Furthermore, the path tracer 46 and the current value indicator 52 shown in FIG. 5A or the rubber band line 19 shown in FIGS. 3B and 3C allow a user to visually perceive the position of the cursor 50 and the value that will be set thereby so that the target value of the variable can be set precisely based on the angular position of where the cursor 50 is located. It is also possible to use a multiple button selection with the embodiments of FIGS. 3B, 3C, 3D, and/or 5A. For example, a first activation selection can be made to display a radial menu. Then, a value of a variable can be set using a second value setting selection.

The double button selection embodiments described above may be used with the radial control menu 10 shown in FIGS. 2 and 3A. That is, the radial control menu 10 may be activated by a first selection, and the movable indicator 18 may be selected and/or moved with a second selection.

Figure 7C:
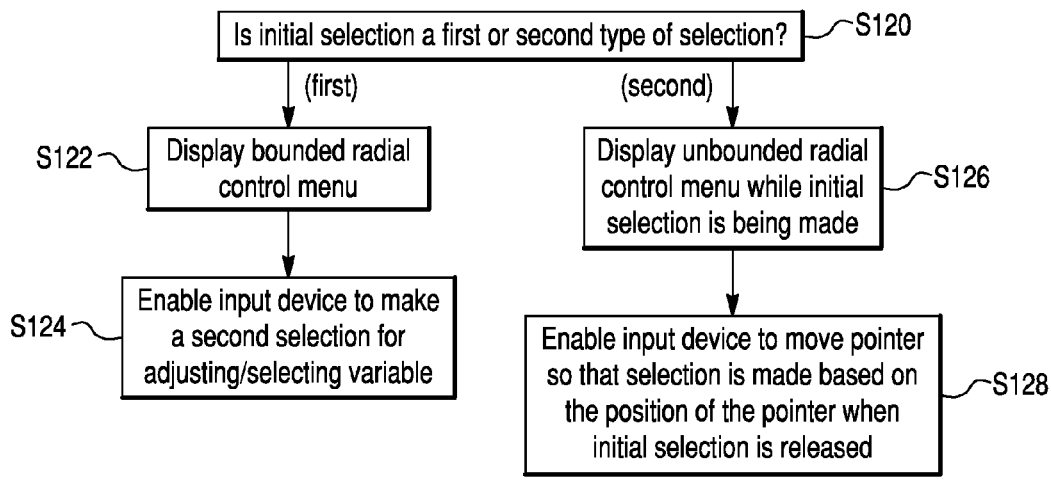

Additionally, the radial control menus described above may be operated in a bounded and unbounded mode giving the user the option of which mode to use as best shown in FIG. 7C. In the unbounded mode, the boundaries of each wedge 12 may extend to the edge of the display 32 (see FIG. 9). That is, there is no visible circumferential boundary to the radial control menu 10. On the other hand, in the bounded mode, the radial control menu 10 is displayed with the radial circumferential boundary 11 as best shown in FIG. 2. At step S120, an initial selection, which is a menu activation command, is received and it is determined whether the initial selection is a first type of selection or a second type of selection. The graphical user interface 26 performs this determination. If the initial selection is the first type of selection, a bounded menu, e.g. the radial control menu 10 shown in FIG. 2, is displayed at step S122. At step S124, the input device 22 (see FIG. 9) is allowed to make a second selection for adjusting/selecting a variable. Here, the user can move the cursor 24 to the desired wedge 12 and/or location to make the selection using a selection button in the manner described above for the double button selection as best shown in FIG. 7A.

On the other hand, if at step S120 it is determined that the initial selection is the second type of selection, the unbounded radial control menu, e.g. the radial control menu 40 shown in FIG. 5A, is displayed at step S126. Step S128 then allows the input device 22 to move the cursor 24 to a target area so that the selection made is based on the position of the cursor 50 when the initial selection is released. In this case, the user can move the cursor 50 into the appropriate wedge 44 and/or location and release the menu activation button to select the menu item/wedge where the cursor 50 is currently located. The user may alternatively release the initial selection when the cursor 50 is at the origin 48 to deactivate the menu. Alternatively, the unbounded menu mode may allow for selections to be made in a manner similar to the bounded menu mode using the double button selection.

It should be noted that the first selection type and the second selection type may be the same button or different buttons. When the two are the same buttons, the interface 26 may distinguish the selections based on the length of time the button is pressed, for example, a tap being determined as a first selection type and a hold being determined as a second selection type.

Another way the unbounded and bounded modes can be selected is by using two different buttons. For example, when the input device 22 (see FIG. 9) is a mouse, the bounded menu mode may be selected by the left button while the unbounded menu may be selected by the right button. Thus, based on preference, a user can select the bounded menu by left clicking, then select the desired wedge/item/value by left clicking again. Similarly, the user can select the unbounded menu by right clicking and holding, then selecting the desired wedge/item/value by releasing the right click.

Figure 7D:
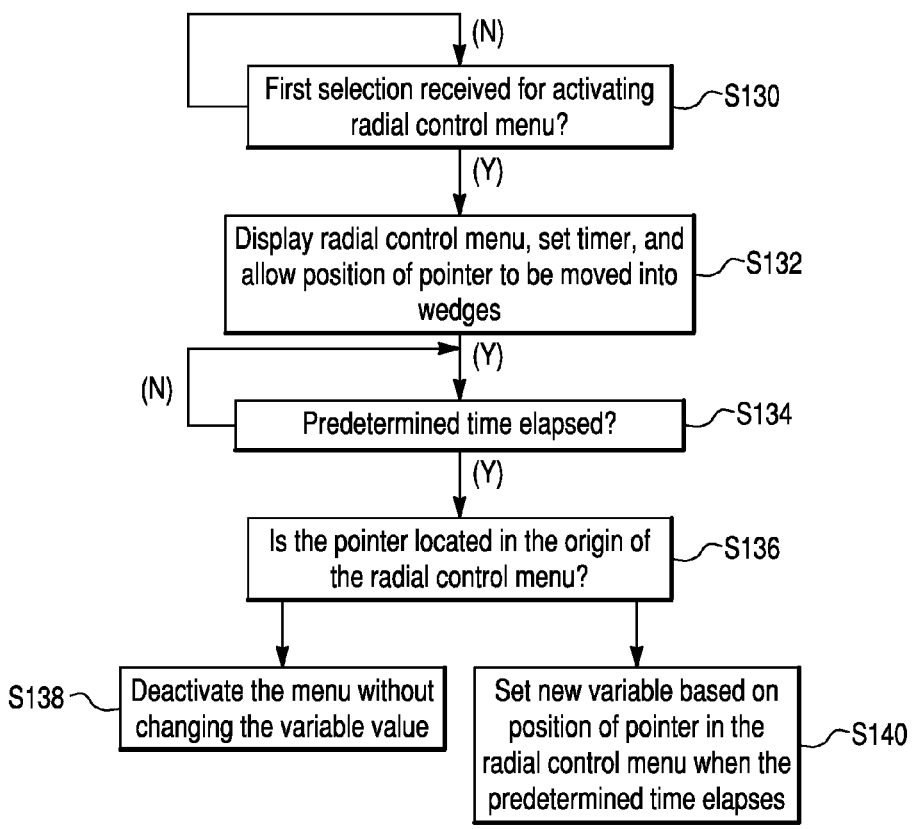

In an alternative embodiment of the present invention referring to FIGS. 2 and 3A to 3D, once the radial control menu 10 is invoked, the cursor 24 may be moved into the desired wedge 12 and a timing function may automatically select the wedge/item/value when a predetermined time has elapsed as best shown in FIG. 7D.

At step S130, it is determined whether a first selection is received for activating the radial control menu 10. If the menu activation command is received, the radial control menu 10 is displayed, a timer (not shown) is set, and the position cursor 24 is allowed to be moved to the appropriate wedge at step S132. If the timer determines that the predetermined time has elapsed at step S134, it is determined whether the cursor 24 is still located at the origin 20 of the menu 10 at step S136. If the cursor 24 is located in the origin 20, the menu 10 is deactivated without making a selection at step S138. Otherwise, a new variable value is set based on the position of the position cursor 24 in the radial control menu 10 at step S140.

Because the menu 10 is displayed such that the origin 20 is positioned where the cursor 24 is located thereby allowing for a quick selection, the predetermined time may be set to be short, for example, 1 second or less. The predetermined time may be adjustable by a user to meet a particular user's needs. For example, if the user is new to the radial control menu 10, the predetermined time may be set longer, while an experienced user that does not need to study the radial control menu 10 to make a selection may want a short predetermined time. Should the predetermined time elapse without the user having moved the cursor 24 into the wedge/item 12 to be selected, the radial control menu 10 would be deactivated so that the user can continue working or reactivate the menu 10 when ready to make a selection.

In an alternative embodiment of the present invention, an activation button may be held for displaying the menu 10 while the input device 22 (see FIG. 9) is used to select or adjust the items/wedges. In this case, the menu 10 is deactivated when the activation button is released regardless of the position of the cursor 24 and regardless of whether a selection or adjustment has been made.

Figure 8:
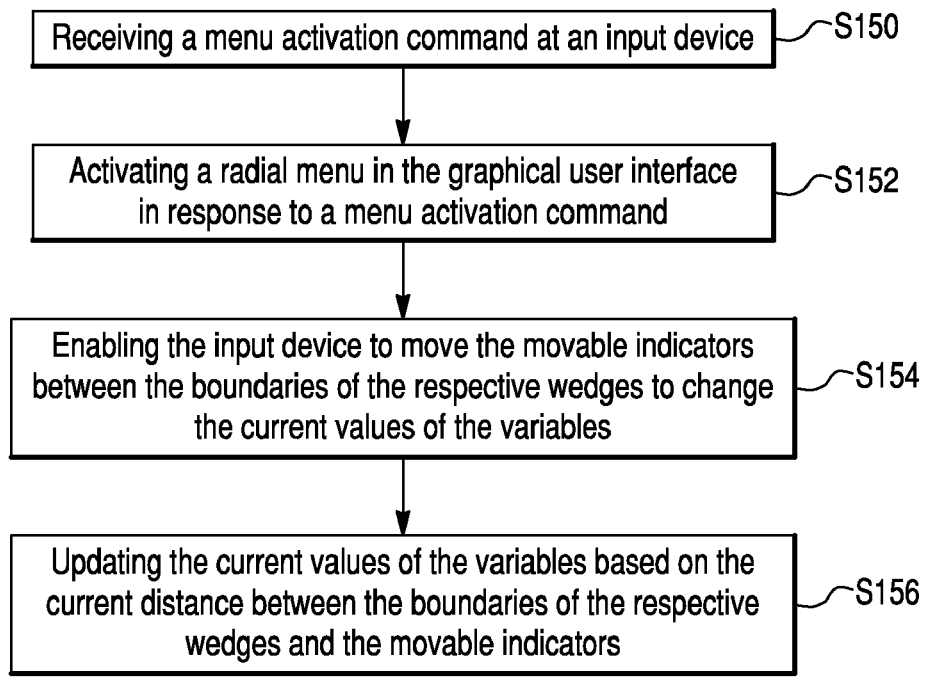
FIG. 8 is a flow chart diagram illustrating a method of controlling variables using a radial control menu according to another embodiment of the present invention.

FIG. 8 shows a method of controlling variables using a radial control menu according to another embodiment of the present invention. The method of FIG. 8 may be performed using the radial control menu 10 shown in FIG. 2. Thus, for explanation purposes, the method of FIG. 8 will be described with reference to FIG. 2. It should be understood, however, that the method shown in FIG. 8 can be applied to the radial menus of any of the embodiments described herein. In this case, the movable indicator(s) in steps S151 to S154 (described below) may refer to a cursor, a selectable movable indicator, a path tracing element, or a rubber band line.

In step S150, a menu activation command is received at the input device 22. In response to the menu activation command received by the input device 22, the radial control menu 10 is activated in the graphical user interface 26 at step S152. The activation of the radial control menu 10 performed at step S152 includes retrieving current variable settings for the wedges 12 in the radial control menu 10 and displaying each wedge 12 including its own movable indicator 18. Then, in step S154, the graphical user interface 26 enables the input device 22 (see FIG. 9) to move the movable indicator(s) 18 between the boundaries 14 and 16 of the respective wedge(s) 12 to change the current values of the variables. Once the movable indicator(s) 18 is moved, the current values of the variables are updated based on the current distance between the boundaries 14 and 16 of the respective wedge(s) 12 and the movable indicator(s) 18 in step S156.

As best shown in FIG. 9, a system 80 allows variables to be controlled using a radial control menu. For simplicity sake, the system 80 of FIG. 9 will be described with reference to the radial control menu 10 of FIG. 2. However, it should be understood that the system 80 may be used with any of the above-described radial control menus and other variations thereof in a similar manner.

The system 80 includes the display 32 which interacts with the graphical user interface 26 so that the user can manipulate the graphics on the display 32. The graphical user interface 26 runs on a processing unit 82 to display the radial control menu 10. The system 80 further includes the input device 22 to enable a user to interact with the graphical user interface 26. The processing unit 82 includes a value storage unit 84 for storing current values of at least one variable. The processing unit 82 also includes an indicator position unit 86 for determining the position of the movable indicator(s) 18 in the respective wedges 12 of the radial control menu 10.

Thus, when the input device 22 moves the movable indicator(s) 18 in radial control menu 10, the indicator position unit 86 determines the new, updated value of the variable based on the new position of the movable indicator(s) 18 within the wedge 12. For example, the indicator position unit 86 may determine the new variable value based on the angular position of the movable indicator(s) 18 with respect to the boundaries 14 and 16 of the wedge 12. To this end, the indicator position unit 86 may include a storage unit (not shown), such as a lookup table, that stores a plurality of angular positions in one to one correspondence with variable values. Once the indicator position unit 86 determines the current, updated value of the variable, the indicator position unit 86 provides this value to the value storage unit 84 for storage.

When the radial control menu 10 is subsequently activated, the indicator position unit 86 retrieves the current variable value stored in the value storage unit 84 and determines the appropriate position of the movable indicator(s) 18 within the respective wedge(s) 12. Accordingly, the radial control menu 10 is displayed by the graphical user interface 26 with the movable indicator(s) 18 positioned appropriately within the wedge(s) 12. The graphical user interface 26 runs on the processing unit 82 to allow a user to interact with the display 32 using the input device 22. The graphical user interface 26 accesses the value storage unit 84 and the indicator position unit 86 to allow the user to manipulate the radial control menu 10. Although the indicator position unit 86 is shown as being separate from the graphical user interface 26, it should be understood that the graphical user interface 26 may alternatively include the functionality of the indicator position unit 86.

Figure 10:
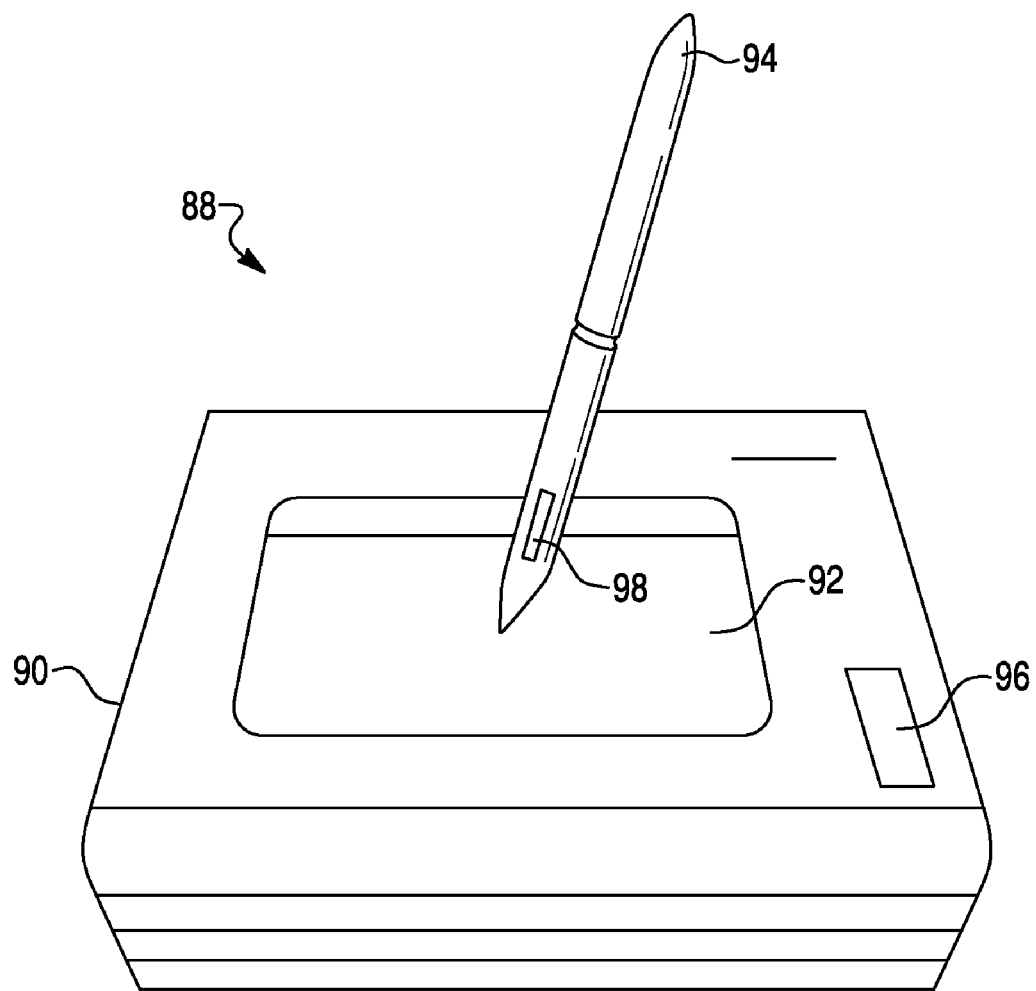
FIG. 10 is a perspective view of a digitizer tablet according to another embodiment of the present invention.

As best shown in FIG. 10, a digitizer tablet 88 may be used as the input device 22 shown in FIG. 9. The digitizer tablet 88 includes a tablet housing 90, a position detecting surface 92 defined by the tablet housing 90, and a pointing device 94 for interacting with the position detecting surface 92 so that the position of the pointing device 94 is detected by the digitizer tablet 88. The pointing device 94 may be a stylus, a mouse, a puck, or the like. The tablet housing 90 includes a button 96, which may be used to activate the radial menu(s) described above. Alternatively, a button 98 on the pointing device 94 may be used to activate the radial menu(s). In some embodiments, the button 96 on the tablet housing 90 is used to activate the radial menu, and the button 98 on the pointing device 94 is used to make a selection in the radial menu. The pointing device 94 can be used on the position detecting surface 92 to move the cursor 24 in the wedge 12 of the radial control menu 10 (see FIG. 2). Accordingly, setting values and/or selecting of menu items in the radial control menu 10 are performed efficiently and conveniently.

It will be appreciated by one of ordinary skill in the art that the apparatus and methods of the various embodiments of the present invention, for example, the methods of FIGS. 7A to 8, the processing unit 82 of FIG. 9 or the graphical user interface 26, can be implemented as software or computer readable recording medium running on a host application. The computer readable recording medium may be any data storage device that can store data which can be thereafter read by a computer system. Examples of the computer readable recording medium include read-only memory (ROM), random-access memory (RAM), CD-ROMs, flash memory, downloadable instructions, magnetic tapes, floppy disks, optical data storage devices, and carrier waves (such as data transmission through the Internet), among other things.

Although embodiments of the present invention have been shown and described, it will be appreciated by those skilled in the art that changes may be made in these embodiments without departing from the principles and spirit of the invention, the scope of which is defined in the appended claims and their equivalents.

We claim:

1. A computer system having a graphical user interface for displaying actions of an input device on a display, said interface comprising:
 a radial menu comprising:
  an origin disposed at a center of said radial menu, and
  at least a first wedge defining an area extending outwardly from said origin, said first wedge associated with a variable that is capable of being set to a value between a predetermined minimum value and a predetermined maximum value; and
 a cursor for indicating a current position of the input device on the display, said cursor being movable within said first wedge to select a current value of the variable based upon the angular position of said cursor with respect to said origin.

2. The computer system having a graphical user interface of claim 1, wherein said radial menu further includes:
 an indicator line drawn continuously between said origin and said current position of said cursor.

3. The computer system having a graphical user interface of claim 1, wherein said first wedge includes a current value indicator displaying the current value of the variable.

4. The computer system having a graphical user interface of claim 3, wherein said current value indicator is displayed in response to said cursor entering or moving within an area bounded by said wedge.

5. The computer system having a graphical user interface of claim 4, wherein said current value indicator is continuously updated while said cursor is being moved.

6. The computer system having a graphical user interface of claim 1, wherein said first wedge comprises:
 a minimum boundary defining a first radial boundary of said first wedge, said minimum boundary representing the predetermined minimum value of the variable; and
 a maximum boundary opposite the minimum boundary, said maximum boundary defining a second radial boundary of said first wedge and representing the predetermined maximum value of the variable,
 wherein said cursor is angularly movable between said maximum and minimum boundaries to adjust the current value of the variable.

7. The computer system having a graphical user interface of claim 6, further comprising:
 a maximum value indicator associated with said maximum boundary, said maximum value indicator displaying the predetermined maximum value of the variable; and
 a minimum value indicator associated with said minimum boundary, said minimum value indicator displaying the predetermined minimum value of the variable.

8. The computer system having a graphical user interface of claim 1, wherein said radial menu further comprises:
 at least a first variable adjuster disposed in said first wedge, said first variable adjuster being angularly movable by said cursor about said origin within said first wedge to select the current value of the variable based upon the angular position of said first variable adjuster within said first wedge.

9. The computer system having a graphical user interface of claim 8, wherein said first variable adjuster comprises a movable line extending from an origin of said radial menu, said movable line having a first end nearest to said origin of said radial menu and a second end farthest from said origin of said radial menu, said movable line being angularly movable by selecting and moving a point between said first end and said second end using said cursor.

10. The computer system having a graphical user interface of claim 8, wherein said first variable adjuster comprises a movable line extending from said origin of said radial menu, said movable line having a first end nearest to said origin and a second end farthest from said origin, said second end corresponding to a position of said cursor so that movement of the cursor changes angular position and/or length of said movable line.

11. The computer system having a graphical user interface of claim 10, wherein the movement of the cursor away from said origin increases the length of said movable line by moving said second end thereof away from said first end, movement of said cursor toward said origin decreases the length of said movable line by moving said second end thereof closer to said first end, and moving said cursor angularly about said origin changes the angular position of said movable line.

12. The computer system having a graphical user interface of claim 10, further comprising:
a tracing line continuously drawn to trace a path of the movement of said cursor throughout the radial menu so that a history of the movement of said cursor is displayed in the graphical user interface.

13. The computer system having a graphical user interface of claim 8, wherein said first variable adjuster comprises a path tracer drawn to follow a path of said cursor into said first wedge.

14. The computer system having a graphical user interface of claim 1, wherein said radial menu is activated in a bounded mode in which said first wedge has an outer boundary opposite to an origin of said radial menu when a first input is received, and said radial menu is activated in an unbounded mode in which said first wedge has no defined outer boundary opposite to the origin of said radial menu when a second input is received, the second input being different from the first input.

15. The computer system having a graphical user interface of claim 14, wherein the first input comprises a selection of a first button, and the second input comprises a selection of a second button.

16. The computer system having a graphical user interface of claim 15, wherein the first input comprises a selection and release of a button associated with the input device, and the second input comprises a selection and hold of the button associated with the input device.

17. The computer system having a graphical user interface of claim 1, wherein said first wedge comprises a plurality of different radial areas each area having a visual characteristic different than the visual characteristic of at least one other area.

18. The computer system having a graphical user interface of claim 1, wherein said first wedge comprises a non-selection area and a selection area, said selection area having a wider arc length.

19. The computer system having a graphical user interface of claim 1, wherein said radial menu further includes:
a second wedge defining a second area extending outwardly from said origin, said second wedge associated with a fixed item that is capable of being selected by said cursor, said second area of said second wedge being smaller than said area of said first wedge.

20. A computer system having a radial menu for use with a graphical user interface, said menu comprising:
at least one wedge representing a control variable, said wedge having a maximum radial boundary representing a predetermined maximum value for the control variable and a minimum radial boundary representing a predetermined minimum value for the control variable, said radial boundaries extending outwardly from an origin of the menu;
at least one movable line indicator extending from the origin of the menu into said wedge, said line indicator having an adjustable angular position for selecting a value for said control variable between the predetermined maximum and minimum values, the value selected for the control variable being determined with respect to the predetermined maximum and minimum values by proportion to an angular distance between said line indicator and said maximum and minimum radial boundaries, respectively.

21. A method of operating a computer system by controlling at least one variable capable of being set to a value between a predetermined minimum value and a predetermined maximum value using an input device operably associated with a graphical user interface having a cursor indicating a current position of the input device, the method comprising the steps of:
activating a radial menu in the graphical user interface in response to a menu activation command, the radial menu having an origin and at least a first wedge associated with the variable extending from the origin so that the cursor is movable inside the first wedge to select a current value for the variable based on the angular position of the cursor about the origin;
receiving a movement command via the input device, the movement command moving the cursor within the first wedge to change the angular position of the cursor about the origin; and
changing the current value of the variable to reflect the changed angular position of the cursor about the origin and displaying the current value of the variable.

22. The method of claim 21, wherein the activation of the radial menu, the reception of the movement command, and the changing of the current value are performed by a single button selection of a button associated with the input device, a depression of the button causing the radial menu to be displayed and a release of the button while the cursor is located in the first wedge causing a selection of the angular position where the cursor is located.

23. The method of claim 21, wherein the activation of the radial menu, the reception of the movement command, and the changing of the current value are performed by a single button selection of a button associated with the input device and a timer that automatically selects the angular position of the cursor in the first wedge when a predetermined time has elapsed since the selection of the button was made.

24. The method of claim 21, wherein:
the activation of the radial menu comprises displaying at least a first variable adjuster in the wedge, the first variable adjuster being selectable with the cursor and angularly movable to change an angular position thereof within the first wedge to select the current value for the variable based on the angular position of the first variable adjuster within the wedge; and the activation of the radial menu, the reception of the movement command, and the changing of the current value are performed by a double button selection of at least one button associated with the input device, a first button selection causing the radial menu to be displayed and a second button selection causing selection and/or movement of the first variable adjuster.

25. The method of claim 24, wherein the second button selection comprises an initial depression of the button to select the first variable adjuster, an intermediate hold of the button causing the first variable adjuster to be angularly movable, and a subsequent release of the button to cause the angular position of the first variable adjuster to be set.

26. A method of operating a computer system by using a radial control menu to set a value of a variable, the radial control menu associated with an input device having at least one button associated therewith and a display having a cursor, the method comprising:

receiving a first selection of the at least one button on the input device;

displaying the radial control menu on the display in response to the first selection, the radial control menu having an origin at a center thereof and at least one wedge extending from the origin, the radial control menu being displayed such that the origin thereof corresponds to a position of the cursor on the display;

moving the input device to move the cursor into the at least one wedge;

determining a current value of the variable based on an angular position of the cursor with respect to the origin and displaying the current value of the variable about the at least one wedge; and receiving a second selection of the at least one button to set the value that is currently displayed as the value of the variable.

27. The method of claim 26, wherein the input device comprises a digitizer tablet having at least one first button and an associated pointing device having at least one second button, and the first selection comprises selecting the at least one first button on the digitizer tablet, and the second selection comprises selecting the at least one second button on the pointing device.

28. The method of claim 26, wherein if, prior to the second selection, the cursor is moved out of the at least one wedge, the current value of the variable is removed from the display in response thereto.

29. A computer system, comprising:

a display for displaying a graphical user interface having a radial control menu, said radial control menu including a plurality of wedges, at least one of said wedges including a movable indicator located therein and movable to determine a value of a corresponding variable based on a position of the movable indicator with respect to at least one reference point within the wedge;

an input device for interacting with the graphical user interface; and a processing unit operably associated with said input device for controlling the graphical user interface and the radial control menu based on operation of said input device, said processing unit including a value storage unit for storing a current value of the variable, and an indicator position unit in communication with said display, said input device, and said value storage unit for controlling the graphical user interface to display the movable indicator based on the current value of the variable and for updating the current value stored in the value storage unit when the position of the movable indicator with respect to the at least one reference point is changed using the input device.

30. The computer system of claim 29, wherein said input device comprises:

a digitizer tablet including a housing, a position detecting surface defined by said housing, and at least one button disposed on said housing, said button being selectable to activate the radial control menu on said display; and a pointing device operably associated with said digitizer tablet being movable to interact with said position detecting surface to control the movable indicator in the radial control menu.

31. A computer system comprising a computer readable medium containing executable code to perform a method of controlling at least one variable capable of being set to a value between a predetermined minimum value and a predetermined maximum value using an input device operably associated with a graphical user interface, the medium comprising:

executable code to activate a radial menu in the graphical user interface in response to a menu activation command, the radial menu having an origin and at least a first wedge associated with the variable extending from the origin so that the cursor is movable inside the first wedge to select a current value for the variable based on the angular position of the cursor about the origin;

executable code to receive a movement command via the input device, the movement command moving the cursor within the first wedge to change the angular position of the cursor about the origin; and executable code to change the current value of the variable to reflect the changed angular position of the cursor about the origin and to display the current value of the variable.

\* \* \* \* \*